US011442699B2

United States Patent
Kozato (10) Patent No.: US 11,442,699 B2
(45) Date of Patent: Sep. 13, 2022

(54) RANDOM NUMBER GENERATING CIRCUIT AND RANDOM NUMBER GENERATING METHOD

(71) Applicant: NEC Corporation, Tokyo (JP)

(72) Inventor: Atsushi Kozato, Tokyo (JP)

(73) Assignee: NEC CORPORATION, Tokyo (JP)

( * ) Notice: Subject to any disclaimer, the term of this patent is extended or adjusted under 35 U.S.C. 154(b) by 43 days.

(21) Appl. No.: 16/756,581

(22) PCT Filed: Nov. 21, 2018

(86) PCT No.: PCT/JP2018/042925
§ 371 (c)(1),
(2) Date: Apr. 16, 2020

(87) PCT Pub. No.: WO2019/107233
PCT Pub. Date: Jun. 6, 2019

(65) Prior Publication Data
US 2020/0285447 A1    Sep. 10, 2020

(30) Foreign Application Priority Data

Nov. 28, 2017  (JP) .............................. JP2017-228299

(51) Int. Cl.
*G06F 7/58*        (2006.01)
(52) U.S. Cl.
CPC .................................... *G06F 7/588* (2013.01)
(58) Field of Classification Search
CPC ...... G06F 7/588; H04L 9/0869; H04L 9/0852
See application file for complete search history.

(56) References Cited

U.S. PATENT DOCUMENTS 6,070,178 A * 5/2000 Anderson ............... G06F 7/588
                                                  375/222
2010/0217789 A1  8/2010 Saitoh et al.
(Continued)

FOREIGN PATENT DOCUMENTS

| JP | H02-145010 A | 6/1990 |
| JP | 2009-230200 A | 10/2009 |
| WO | WO-2007/083417 A1 | 7/2007 |

OTHER PUBLICATIONS

International Search Report corresponding to PCT/JP2018/042925 dated Feb. 26, 2019 (one page).
(Continued)

*Primary Examiner* — Matthew D Sandifer
*Assistant Examiner* — Huy Duong (57) ABSTRACT

To enables to obtain difficult-to-predict random numbers without requiring a more complex circuit configuration, the random number generating circuit is configured to include a light output means, a light receiving means, a current/voltage converting means, a comparing means, a sampling means, and an output means. The light output means outputs light of a prescribed wavelength. The light receiving means receives the light and converts the same into current signals. The current/voltage converting means converts the current signals into voltage signals. The comparing means compares the voltage signals with a reference voltage and converts the voltage signals into binary signals. The sampling means samples, at a cycle set on the basis of the light noise frequency, the binary signals converted by the comparing means and converts the same into bit data. The output means outputs bit string data arranged in the order of conversion of the bit data.

3 Claims, 8 Drawing Sheets

(56) References Cited

U.S. PATENT DOCUMENTS

| | | | | |
|---|---|---|---|---|
| 2012/0221615 A1* | 8/2012 | Cerf | ................. | G06F 7/588 |
| | | | | 708/250 |
| 2014/0337400 A1* | 11/2014 | Chong | ................. | G01J 1/0425 |
| | | | | 708/255 |
| 2018/0039485 A1* | 2/2018 | Wilber | ................. | G06F 7/588 |

OTHER PUBLICATIONS

Written Opinion corresponding to PCT/JP2018/042925 dated Feb. 26, 2019 (6 pages).
NIST Special Publication 800-22 Revision 1a—National Institute of Standards and Technology—Technology Administration Department of Commerce; A Statistical Test Suite for Random and Pseudorandom Number Generators for Cryptographic Applications; Rukhin et al.; Apr. 2010 (pp. 1-131).

* cited by examiner

| COLLECTION NUMBER | (n) | (n+1) | (n+2) | (n+3) |
|---|---|---|---|---|
| COMPARING UNIT OUTPUT | H | LO | H | OH |
| INVERTING UNIT OUTPUT | LO | H | LO | L |
| OUTPUT OF SAMPLING UNIT<br>* WHEN MARKS OF ○ ARE COLLECTED | L | L | L | H |

RANDOM NUMBER GENERATING CIRCUIT AND RANDOM NUMBER GENERATING METHOD

CROSS REFERENCE TO RELATED APPLICATIONS

This application is a national stage application of International Application No. PCT/JP2018/042925 entitled "Random Number Generating Circuit and Random Number Generating Method" filed on Nov. 21, 2018, which claims priority to Japanese Patent Application No. 2017-228299 filed on Nov. 28, 2017, the disclosures of which are hereby incorporated by reference in their entirety.

TECHNICAL FIELD

The present invention relates to a technique of generating a random number, and particularly relates to a technique of generating a random number, based on light output from a laser.

BACKGROUND ART

Accompanying development of information and communication techniques, necessity of acquiring a random number of a large numeric value in encryption or the like has increased. Because of development of a big data analysis technique and a technique concerning artificial intelligence (AI), it has become important to acquire a random number being difficult to predict or estimate. Since processing such as encryption is performed in various devices, it is desirable that a random number generating circuit that generates a random number has a configuration being small in size and simplified as much as possible.

As a method of acquiring a random number being difficult to predict or estimate, there is a method of acquiring a random number from a natural phenomenon having high contingency, instead of a random number generated in a pseudo manner. As one of techniques of acquiring a random number by using a natural phenomenon, there is a technique of acquiring a random number, based on light output from a laser. An example of such a technique of acquiring a random number, based on light output from a laser is a technique as disclosed in PTL 1.

A random number generating circuit of PTL 1 generates a random number, based on light output from a chaos laser oscillator including a laser and a mirror. The chaos laser oscillator of PTL 1 operates by reflecting, by the mirror, light output from the laser, and thereby making the light incident on the laser. The random number generating circuit of PTL 1 generates a binary random number, based on fluctuation in power output from the chaos laser oscillator.

CITATION LIST

Patent Literature

[PTL 1] Japanese Unexamined Patent Application Publication No. 2009-230200

SUMMARY OF INVENTION

Technical Problem

However, the technique of PTL 1 is not sufficient in the following point. The random number generating circuit of PTL 1 needs an optical path in which light output from the laser is reflected by the mirror and is thereby made incident on the laser in order to exhibit a function as a chaos laser, and needs an optical path in which light output from the laser is received and converted into an electric signal. Accordingly, a complex optical system needs to be formed with high precision, and thus, there is a possibility that a configuration of the random number generating circuit becomes complicated. For this reason, the technique of PTL 1 is not sufficient as a technique for acquiring a random number being difficult to predict, without complicating a circuit configuration.

In order to solve the above-described problem, an object of the present invention is to provide a random number generating circuit that can acquire a random number being difficult to predict, without complicating a circuit configuration.

Solution to Problem

In order to solve the above-described problem, a random number generating circuit according to the present invention includes a light output means, a light receiving means, a current/voltage converting means, a comparing means, a sampling means, and an output means. The light output means outputs light of a prescribed wavelength. The light receiving means receives light, and converts the light into a current signal. The current/voltage converting means converts the current signal into a voltage signal. The comparing means converts the voltage signal into a binary signal by comparison with a reference voltage. The sampling means samples, at a cycle being set based on a frequency of noise of the light, the binary signal converted by the comparing means, and converts the sampled signal into bit data. The output means outputs bit string data in which the bit data are arranged in order of being converted.

A random number generating method according to the present invention includes: outputting light of a prescribed wavelength; receiving light; converting the light into a current signal; converting the current signal into a voltage signal; and converting the voltage signal into a binary signal by comparison with a reference voltage. The random number generating method according to the present invention further includes: sampling, at a cycle being set based on a frequency of noise of the light, the converted binary signal, and converting the sampled signal into bit data; and outputting bit string data in which the bit data are arranged in order of being converted.

Advantageous Effects of Invention

According to the present invention, a random number being difficult to predict can be acquired without complicating a circuit configuration.

EXAMPLE EMBODIMENT

First Example Embodiment

Figure 1:
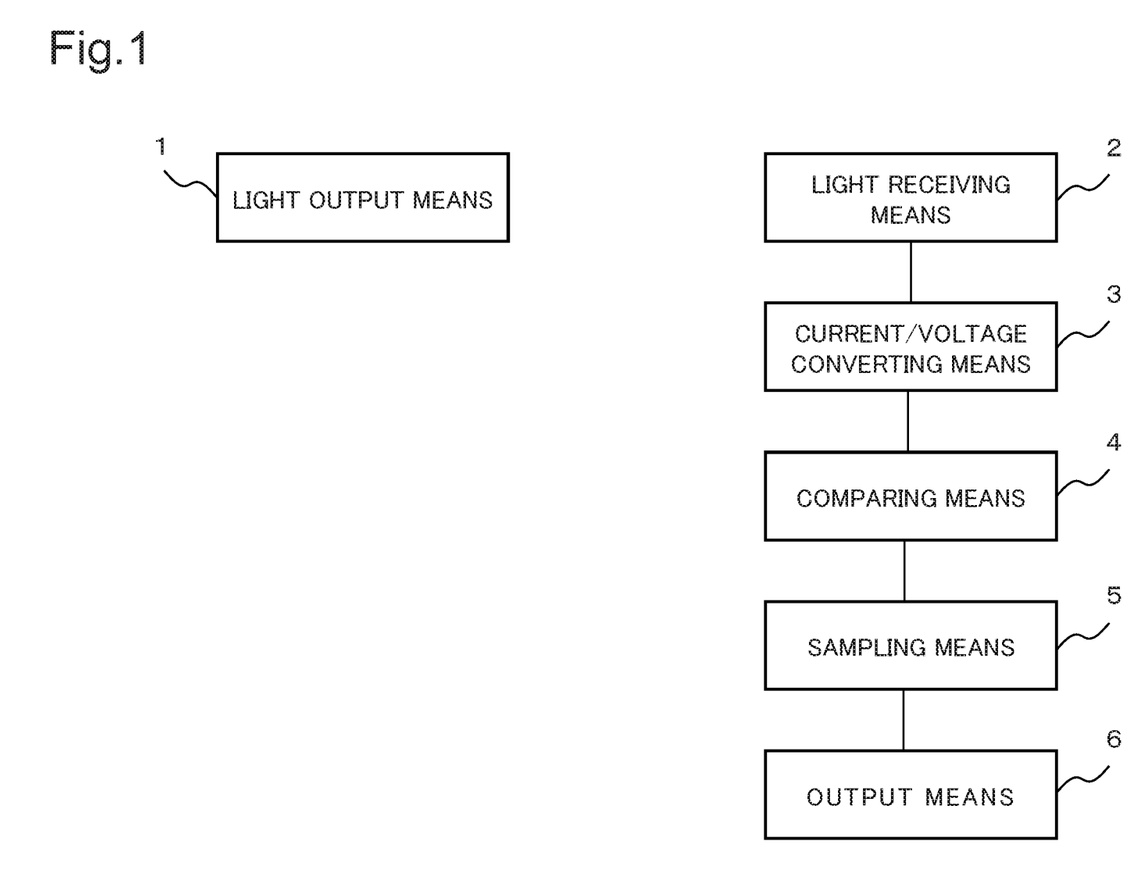
FIG. 1 is a diagram illustrating an outline of a configuration of a first example embodiment of the present invention.

A first example embodiment of the present invention is described in detail with reference to the drawing. FIG. 1 illustrates an outline of a configuration of a random number generating circuit according to the present example embodiment. The random number generating circuit according to the present example embodiment includes a light output means 1, a light receiving means 2, a current/voltage converting means 3, a comparing means 4, a sampling means 5, and an output means 6. The light output means 1 outputs light of a prescribed wavelength. The light receiving means 2 receives the light, and converts the light into a current signal. The current/voltage converting means 3 converts the current signal into a voltage signal. By comparison with a reference voltage, the comparing means 4 converts the voltage signal into a binary signal. At a cycle set based on a frequency of noise of the light, the sampling means 5 samples the binary signal converted by the comparing means 4, and converts the sampled signal into bit data. The output means 6 outputs bit string data in which the bit data are arranged in the order of being converted.

In the random number generating circuit according to the present example embodiment, light output from the light output means 1 is received and converted into a current signal by the light receiving means 2, and is converted into a voltage signal by the current/voltage converting means 3. In the random number generating circuit according to the present example embodiment, at a cycle set based on a frequency of noise of the light, a binary signal converted from the voltage signal by the comparing means 4 is sampled and converted into bit data by the sampling means 5. Thus, the random number generating circuit according to the present example embodiment samples, at a cycle set based on a frequency of noise of light, a voltage signal converted from light, and can thereby output a random number without complicating a circuit configuration.

Second Example Embodiment

Figure 2:
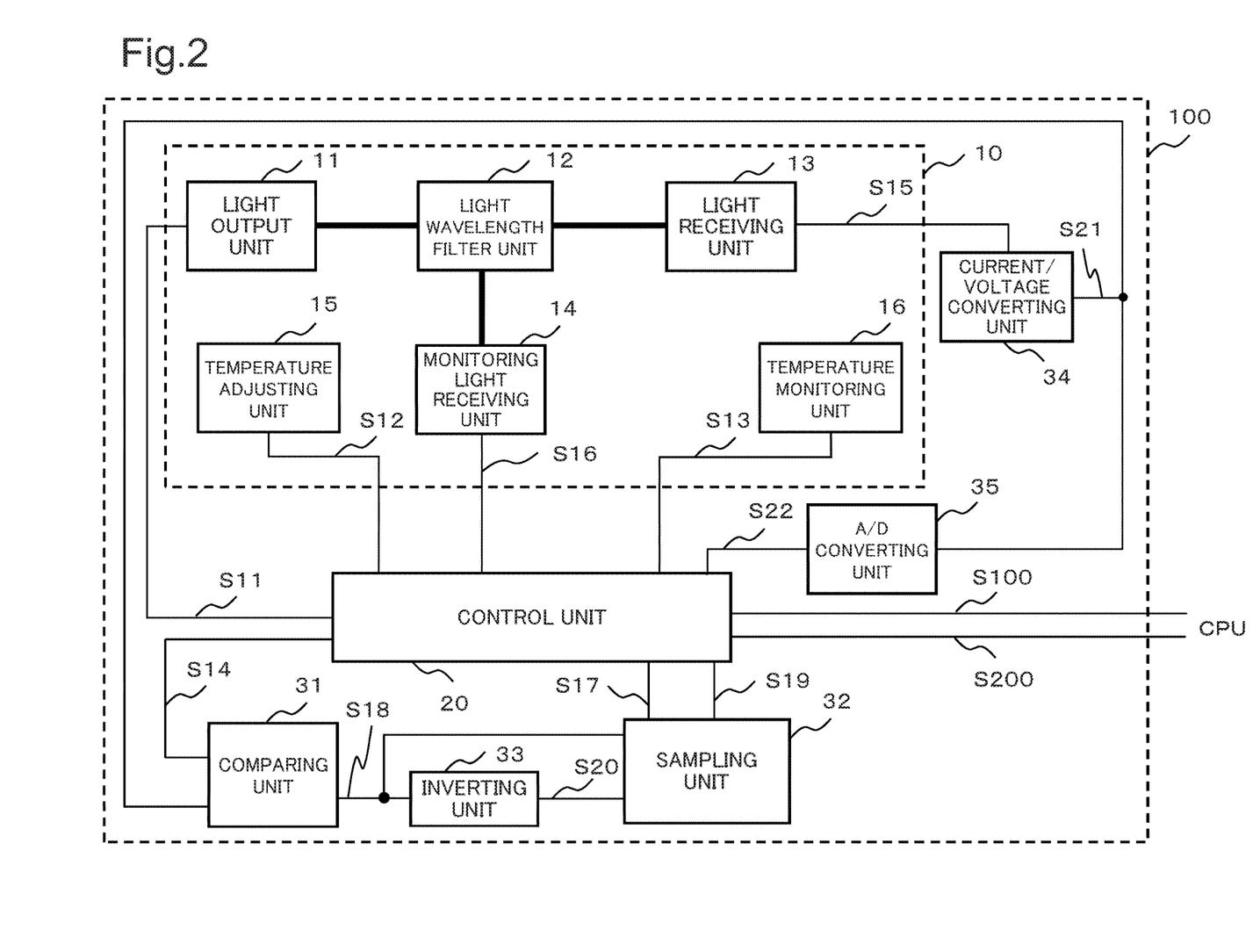
FIG. 2 is a diagram illustrating an outline of a configuration of a second example embodiment of the present invention.

A second example embodiment of the present invention is described in detail with reference to the drawings. FIG. 2 illustrates an outline of a configuration of a random number generating circuit according to the present example embodiment. The random number generating circuit 100 according to the present example embodiment includes an optical module 10, a control unit 20, a comparing unit 31, a sampling unit 32, an inverting unit 33, a current/voltage converting unit 34, and an A/D converting unit 35. The random number generating circuit 100 is connected to a central processing unit (CPU), and outputs, to the CPU, data of the generated random number and information concerning a light state on which the random number is based.

The optical module 10 further includes a light output unit 11, a light wavelength filter unit 12, a light receiving unit 13, a monitoring light receiving unit 14, a temperature adjusting unit 15, and a temperature monitoring unit 16. The light output unit 11, the light wavelength filter unit 12, the light receiving unit 13, and the monitoring light receiving unit 14 of the optical module 10 are formed on the same board, and are fixed in such a way that displacement does not occur in an optical system. All parts of the optical module 10 are accommodated in a housing.

The light output unit 11 includes a laser diode and a current source supplying current to the laser diode, and outputs light having a prescribed wavelength. Power of the light output by the light output unit 11 is controlled by a value of current supplied by the current source. A current value of the current supplied by the current source is set based on a current control signal S11 sent from the control unit 20. Light output from the light output unit 11 is input to the light wavelength filter unit 12. A configuration may be made in such a way that the current source is provided outside the optical module 10, and current is supplied from the current source to the laser diode inside the optical module 10.

A wavelength of light output by the light output unit 11 may be corrected based on a wavelength of light measured by the monitoring light receiving unit 14. In the case of such a configuration, a light output module capable of varying a wavelength is used in the light output unit 11. Correcting a wavelength of light output by the light output unit 11, based on a wavelength of light measured by the monitoring light receiving unit 14 enables a high-quality random number to be continuously acquired even when a wavelength characteristic changes due to aging or temperature change.

The light wavelength filter unit 12 is provided as a band pass filter through which light of a prescribed wavelength input from the light output unit 11 is allowed to pass. An example usable as the light wavelength filter unit 12 is a dielectric multilayer filter. Light on which filter processing has been exerted in the light wavelength filter unit 12 is split and input to the light receiving unit 13 and the monitoring light receiving unit 14.

The light receiving unit 13 includes a photodiode, and converts light input from the light wavelength filter unit 12, into a current signal. To the photodiode, a DC bias circuit is connected, and a bias voltage is applied to the photodiode. The current signal converted from light by the light receiving unit 13 is input as a current signal S15 to the current/voltage converting unit 34. In the case of a configuration in which a wavelength of light of the light output unit 11 is corrected, information indicating a state of the correction is sent to the CPU via the control unit 20, and the CPU is informed of normality of a function of the light output unit 11.

The monitoring light receiving unit 14 measures a wavelength of light input from the light wavelength filter unit 12, and acquires data for monitoring a deviation, from a set value, of a wavelength of light that has passed through the light wavelength filter unit 12. The monitoring light receiving unit 14 includes a monochromator, and measures a spectrum of input light. Based on the spectrum of the light measured by the monitoring light receiving unit 14, a wavelength at which power of the light reaches its peak is detected, and thereby, a wavelength of the input light is specified. The monitoring light receiving unit 14 outputs information of the measured spectrum of the light as a monitoring result signal S16 to the control unit 20.

The temperature adjusting unit 15 includes a function of keeping a temperature inside the optical module 10 at a set temperature. The temperature adjusting unit 15 includes a Peltier element, and adjusts a temperature inside the optical module 10 in such a way as to become the set temperature. The temperature adjusting unit 15 operates based on a temperature control signal S12 sent from the control unit 20, and thereby heats or cools an inside of the housing of the optical module 10.

The temperature monitoring unit 16 measures a temperature inside the optical module 10, and sends the measured temperature data as a temperature measurement signal S13 to the control unit 20.

Figure 3:
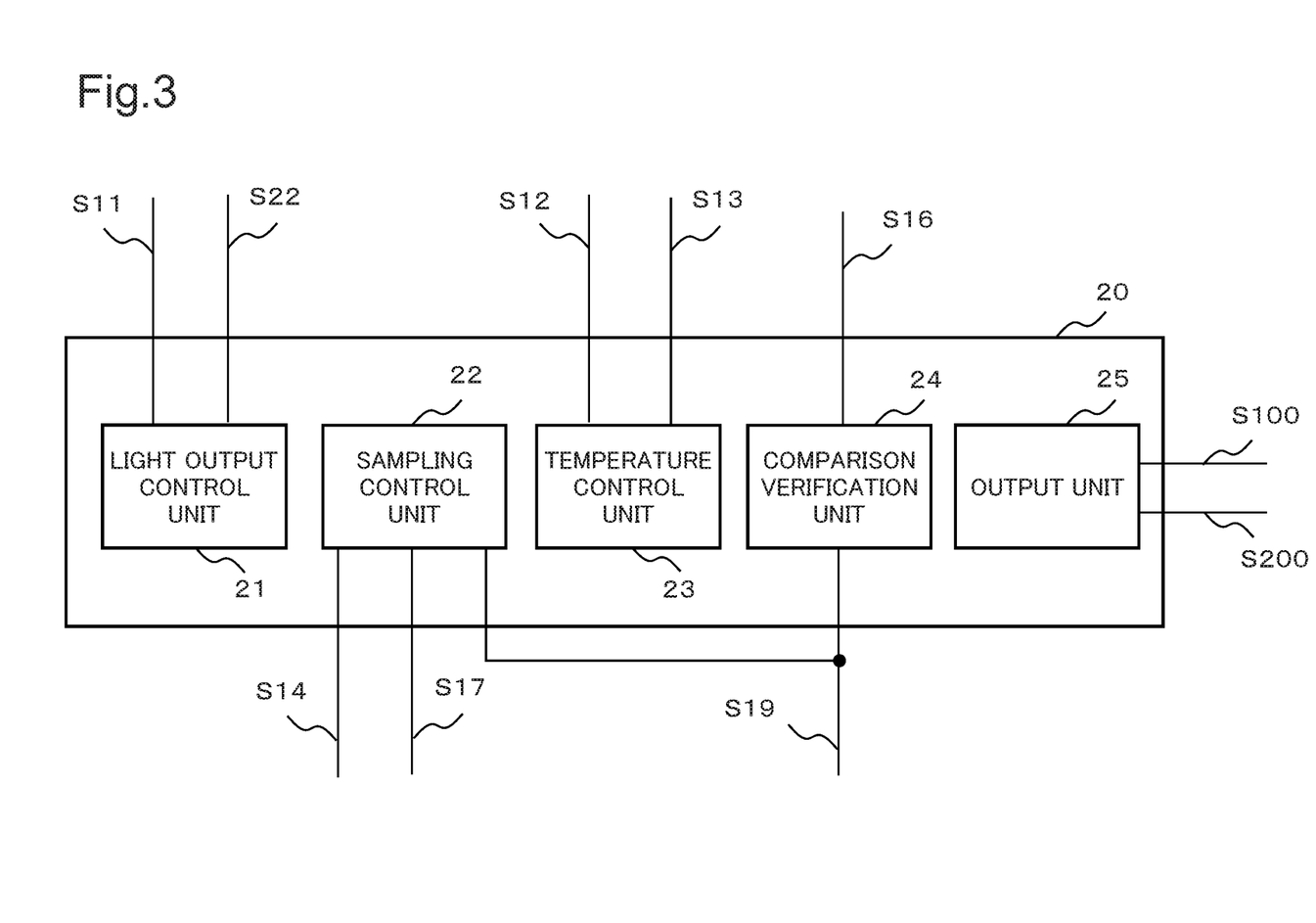
FIG. 3 is a diagram illustrating a configuration of a control unit of the second example embodiment of the present invention.

The following describes a configuration of the control unit 20. FIG. 3 illustrates an outline of the configuration of the control unit 20 of the present example embodiment. The control unit 20 includes a light output control unit 21, a sampling control unit 22, a temperature control unit 23, a comparison verification unit 24, and an output unit 25. Connection between the units of the control unit 20 is made by a bus. The control unit 20 is configured by a semiconductor device such as a central processing unit (CPU) or a field programmable gate array (FPGA).

The light output control unit 21 controls power of light output by the light output unit 11 in such a way that an average of the power of the light received by the light receiving unit 13 becomes a set value. Based on a light power value input as a digital converted signal S22 from the A/D converting unit 35, the light output control unit 21 determines an increase or decrease value of a current value in the light output unit 11 in such a way that power of light received by the light receiving unit 13 becomes constant. The light output control unit 21 sends, to the light output unit 11, as a current control signal S11, information of the current value of the light output unit 11 set in such a way that power of light received by the light receiving unit 13 becomes constant.

The sampling control unit 22 sends, to the comparing unit 31, as a threshold voltage signal S14, an analog signal of a reference voltage serving as a reference when the comparing unit 31 determines "Low" or "High". The sampling control unit 22 determines the reference voltage serving as a threshold value in such a way that a ratio of "Low" and "High" of signals input as sampling result signals S19 becomes 1:1. The sampling control unit 22 sends, to the sampling unit 32, as a sampling cycle signal S17, a clock indicating a sampling cycle in the sampling unit 32.

The sampling cycle is set depending on a cycle of noise of light output from the laser diode of the light output unit 11 and a circuit frequency characteristic of the light/electricity conversion. The sampling cycle may be variable depending on a ratio of "Low" and "High" of signals sampled by the sampling unit 32.

The temperature control unit 23 controls the temperature adjusting unit 15 in such a way that a temperature inside the optical module 10 becomes a set value. The temperature control unit 23 determines an increase or decrease value of a temperature, based on temperature data sent as a temperature measurement signal S13 from the temperature monitoring unit 16. The temperature control unit 23 generates, based on the increase or decrease value of a temperature, a signal indicating a set temperature for the temperature adjusting unit 15, and sends the generated signal as a temperature control signal S12 to the temperature adjusting unit 15.

The comparison verification unit 24 monitors data input as a sampling result signal S19 from the sampling unit 32, determines whether a generated random number is statistically appropriate, and generates, as quality data, information of the determination result. The comparison verification unit 24 confirms quality on a random number by performing the random number test based on NIST SP800-22 defined by the National Institute of Standards and Technology (NIST) of the Department of Commerce in the United States, for example. The quality data are composed of, for example, an index indicating whether a random number is statistically appropriate.

Based on the data of a light wavelength sent as a monitoring result signal S16 from the monitoring light receiving unit 14, the comparison verification unit 24 determines a deviation from a prescribed wavelength set as a wavelength output by the light output unit 11. The comparison verification unit 24 adds, to the quality data, a wavelength of light received by the monitoring light receiving unit 14 or a deviation amount from the prescribed wavelength, and sends the quality data to the output unit 25.

The output unit 25 outputs, as an output signal S100, bit string data generated as data for a random number, to an external CPU or the like that performs processing such as encryption using a random number. In response to a request sent as a request signal S200 from the CPU or the like, the output unit 25 outputs, to the CPU or the like, as an output signal S100, the quality data generated by the comparison verification unit 24.

The comparing unit 31 includes a function of comparing input signals and outputting the comparison result as a comparison result signal S18. The comparing unit 31 is constituted by using a comparator. The comparing unit 31 compares a voltage of a signal input as a threshold voltage signal S14 from the sampling control unit 22, with a voltage of a signal input as a voltage signal S21 from the current/voltage converting unit 34. When the voltage signal S21 is larger than the threshold voltage signal S14, the comparing unit 31 outputs a "High" signal as a comparison result signal S18. When the voltage of the voltage signal S21 is equal to or lower than the voltage of the threshold voltage signal S14, the comparing unit 31 outputs a "Low" signal as a comparison result signal S18. The signal output from the comparing unit 31 is split into two paths, one of the split signals is directly input to the sampling unit 32, and the other of the split signals is input to the sampling unit 32 via the inverting unit 33.

The inverting unit 33 inverts a signal input as a comparison result signal S18, and outputs the inverted signal. The inverting unit 33 is constituted by using an inverter. The inverting unit 33 converts an input "High" signal into a "Low" signal, converts an input "Low" signal into a "High" signal, and outputs the inverted signal as an inverted signal S20. The inverting unit 33 sends the inverted signal as an inverted signal S20 to the sampling unit 32.

The current/voltage converting unit 34 is configured as a current/voltage converting circuit that converts an input current signal S15 into a voltage signal, and outputs the voltage signal as a voltage signal S21.

The A/D converting unit 35 converts an analog signal input as a voltage signal S21 from the current/voltage converting unit 34, into a digital signal, and outputs the digital signal as a digital converted signal S22 to the control unit 20. The A/D converting unit 35 outputs, to the control unit 20, as the digital converted signal S22 in the form of a digital signal, information of a voltage value of the voltage signal S21 input from the current/voltage converting unit 34.

Figure 4:
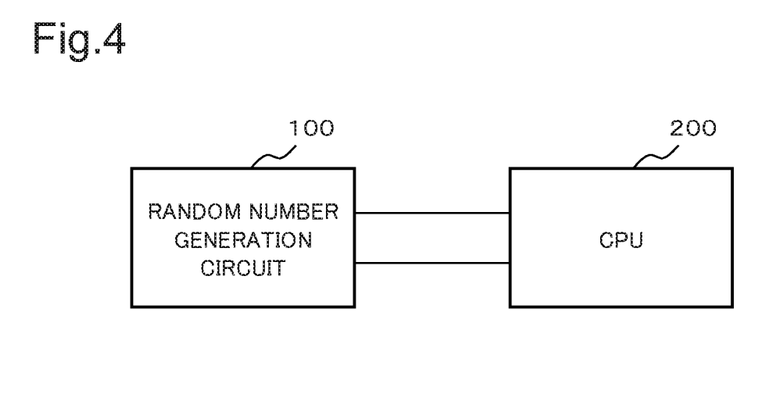
FIG. 4 is a diagram illustrating an example of a configuration of a random number generating system according to the second example embodiment of the present invention.

FIG. 4 illustrates an example of a configuration of a random number generating system constituted by the random number generating circuit 100 according to the present example embodiment and the CPU 200. The CPU 200 sends, to the random number generating circuit 100, as a request signal S200, a signal of requesting data of a random number or information of a generation state of a random number. In response to the request signal S200, the random number generating circuit 100 sends, as an output signal S100, data of a random number or information of a generation state of a random number. The CPU 200 executes each processing item such as encryption by using, as a random number, bit string data acquired from the random number generating circuit 100. The CPU 200 requests quality data from the random number generating circuit 100, and receives quality data as a response, thereby monitoring a generation state of a random number in the random number generating circuit 100.

The following describes operation of the random number generating circuit according to the present example embodiment. When the random number generating circuit 100 starts to operate, the light output control unit 21 of the control unit 20 sends, to the light output unit 11 of the optical module 10, as a current control signal S11, a signal indicating a value of current supplied to the laser diode by the current source. An initial value of a value of current supplied to the laser diode by the current source is previously set. As the initial value of current supplied to the laser diode by the current source, a value set at the last operation may be stored and used.

Figure 5:
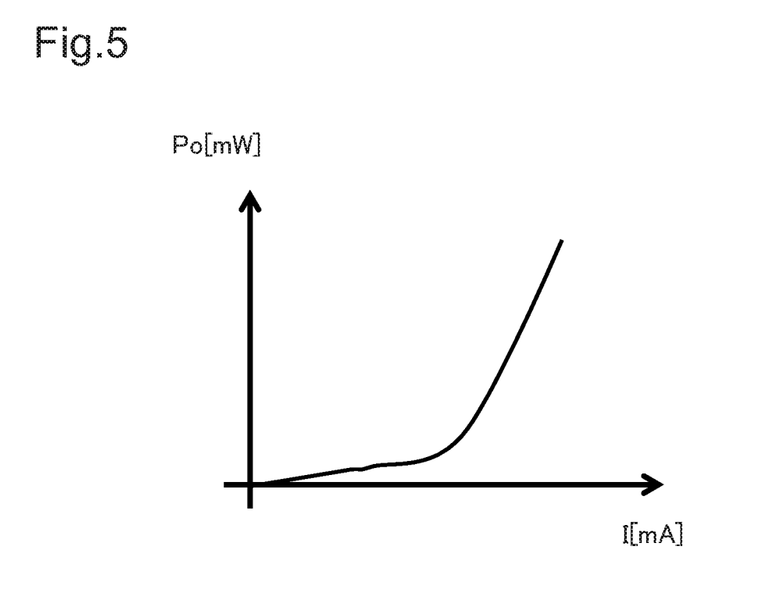
FIG. 5 is a diagram illustrating an example of a relation between power of light output by a laser diode and current in the second example embodiment of the present invention.

When receiving a current control signal S11, the light output unit 11 supplies, from the current source to the laser diode, current of a current value indicated by the current control signal S11, and outputs continuous light of a previously set wavelength. FIG. 5 illustrates an example of a relation between current flowing through the laser diode and power of output light in the light output unit 11.

Light output from the light output unit 11 is input to the light wavelength filter unit 12. When light is input, the light wavelength filter unit 12 exerts filter processing, and thereby allows only light in a set band to pass. The light wavelength filter unit 12 splits, into two pieces, the light on which the filter processing has been exerted, and outputs the two pieces to the light receiving unit 13 and the monitoring light receiving unit 14.

Figure 6:
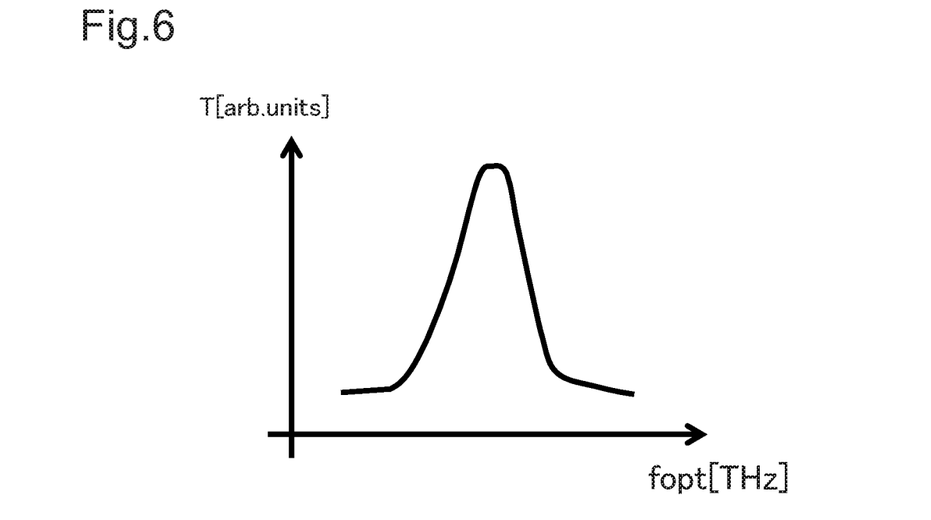
FIG. 6 is a diagram illustrating an example of a filter characteristic in the second example embodiment of the present invention.

FIG. 6 illustrates an example of a filter characteristic of the light wavelength filter unit 12. The horizontal axis of FIG. 6 indicates a frequency of light, and the vertical axis indicates a transmissivity of light for each frequency. A wavelength of light transmitted through the light wavelength filter unit 12 is set in such a way as to be adjusted to a wavelength of light output by the light output unit 11.

When light is input to the monitoring light receiving unit 14, the monitoring light receiving unit 14 measures a spectrum of the input light, and sends the measurement result as a monitoring result signal S16 to the comparison verification unit 24 of the control unit 20.

Light input to the light receiving unit 13 is converted into a current signal by the photodiode, and is sent as a current signal S15 to the current/voltage converting unit 34.

When a current signal S15 is input, the current/voltage converting unit 34 converts the input current signal into a voltage signal, and outputs the converted voltage signal as a voltage signal S21. The voltage signal S21 output from the current/voltage converting unit 34 is split into two paths, and is sent to the comparing unit 31 and the A/D converting unit 35.

Figure 7:
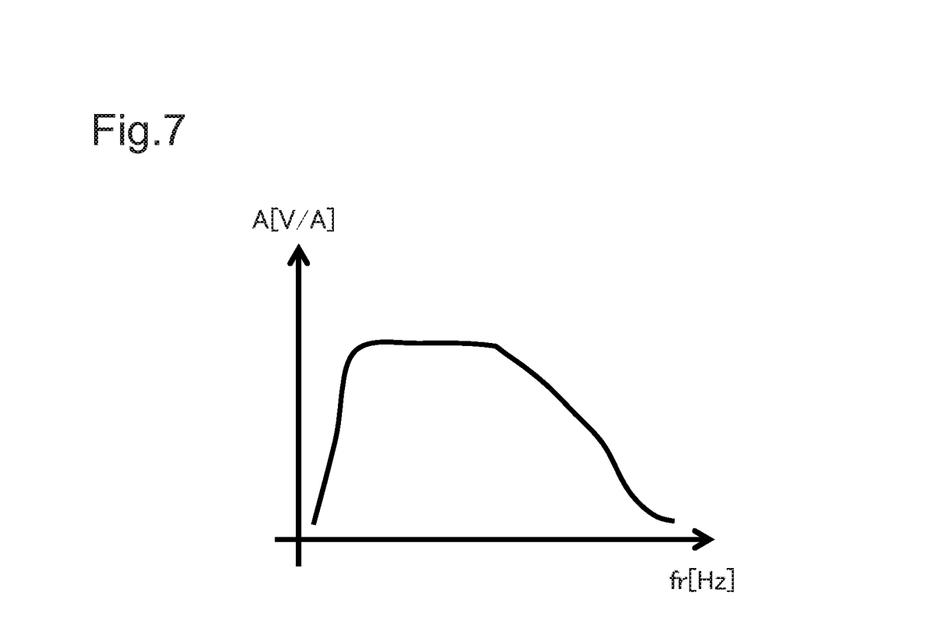
FIG. 7 is a diagram illustrating an example of a characteristic of a current/voltage converting circuit in the second example embodiment of the present invention.

FIG. 7 is a diagram illustrating an example of a characteristic of the current/voltage converting circuit in the current/voltage converting unit 34 of the random number generating circuit 100. FIG. 7 is a diagram illustrating efficiency of conversion from current to voltage for each frequency. In FIG. 7, the horizontal axis indicates a frequency of an electric signal, and the vertical axis indicates efficiency of conversion from current to voltage when a current value of an input current signal is the same.

A signal input as a voltage signal S21 to the A/D converting unit 35 is converted into a digital signal, and information of a voltage value of the input voltage signal S21 is input as a digital converted signal S22 to the light output control unit 21 of the control unit 20.

When a voltage signal S21 is input to the comparing unit 31, the comparing unit 31 compares a voltage of the voltage signal S21 with a voltage of a threshold voltage signal S14 input, as a signal indicating a reference voltage, from the sampling control unit 22 of the control unit 20.

When a voltage of a voltage signal S21 is higher than a reference voltage, the comparing unit 31 outputs a "High" signal. When the voltage of the voltage signal S21 is equal to or lower than the reference voltage, the comparing unit 31 outputs a "Low" signal as a comparison result signal S18. The comparison result signal S18 output from the comparing unit 31 is split into two pieces, one of the two pieces is directly input to the sampling unit 32, and the other of the two pieces is input to the inverting unit 33.

Figure 8:
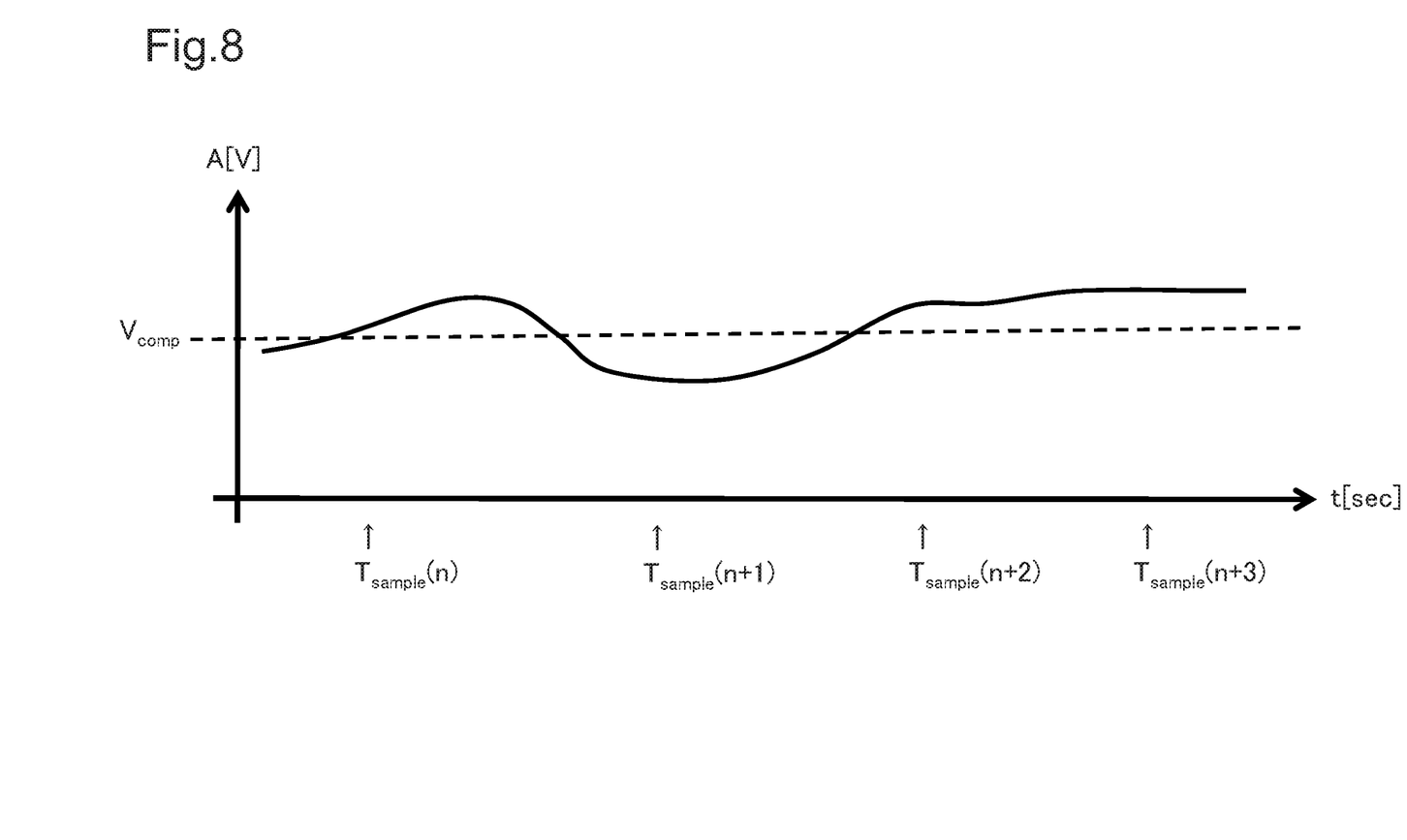
FIG. 8 is a diagram illustrating an example of sampling timings in the second example embodiment of the present invention.

FIG. 8 illustrates an example of a signal input to the comparator of the comparing unit 31. The sign $V_{comp}$ in FIG. 8 indicates a reference voltage. In FIG. 8, the horizontal axis indicates time when sampling is performed, and the vertical axis indicates voltage of the input signal.

Figure 9:
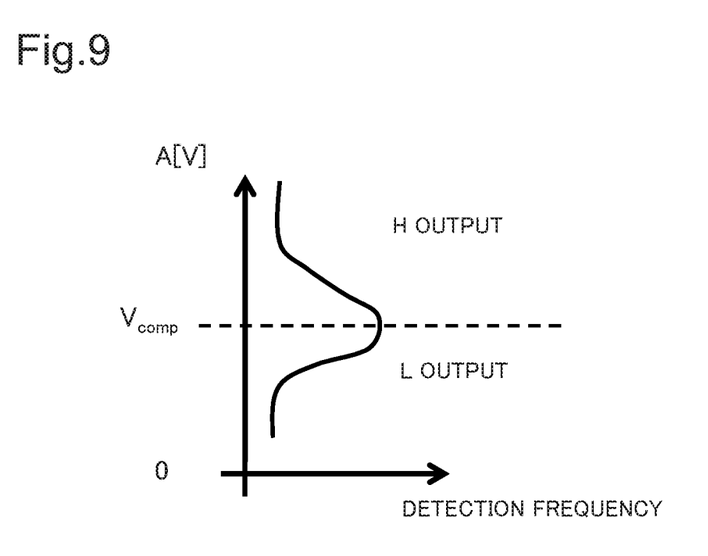
FIG. 9 is a diagram illustrating an example of a relation between amplitude and a detection frequency of a voltage signal in the second example embodiment of the present invention.

FIG. 9 illustrates a relation between amplitude of an input signal of the sampling unit 32 and a frequency of appearance for each amplitude. In FIG. 9, "H OUTPUT" corresponds to a "High" signal, and "L OUTPUT" corresponds to a "Low" signal. As illustrated in FIG. 9, by properly setting a reference voltage $V_{comp}$, it is expected that "High" and "Low" is detected at almost the same frequency.

When a comparison result signal S18 is input, the inverting unit 33 makes inversion between "High" and "Low" of potential of the input signal, and outputs the inverted signal as an inverted signal S20 to the sampling unit 32.

When a comparison result signal S18 and an inverted signal S20 are input, the sampling unit 32 samples the input signals. The sampling unit 32 distinguishes "High" and "Low" of the signals input from the comparison result signal S18 and the inverted signal S20, and alternately samples the signals input from the comparison result signal S18 and the inverted signal S20. The sampling unit 32 samples the input signal, based on a signal indicating a sampling timing sent as a sampling cycle signal S17 from the control unit 20.

Figure 10:
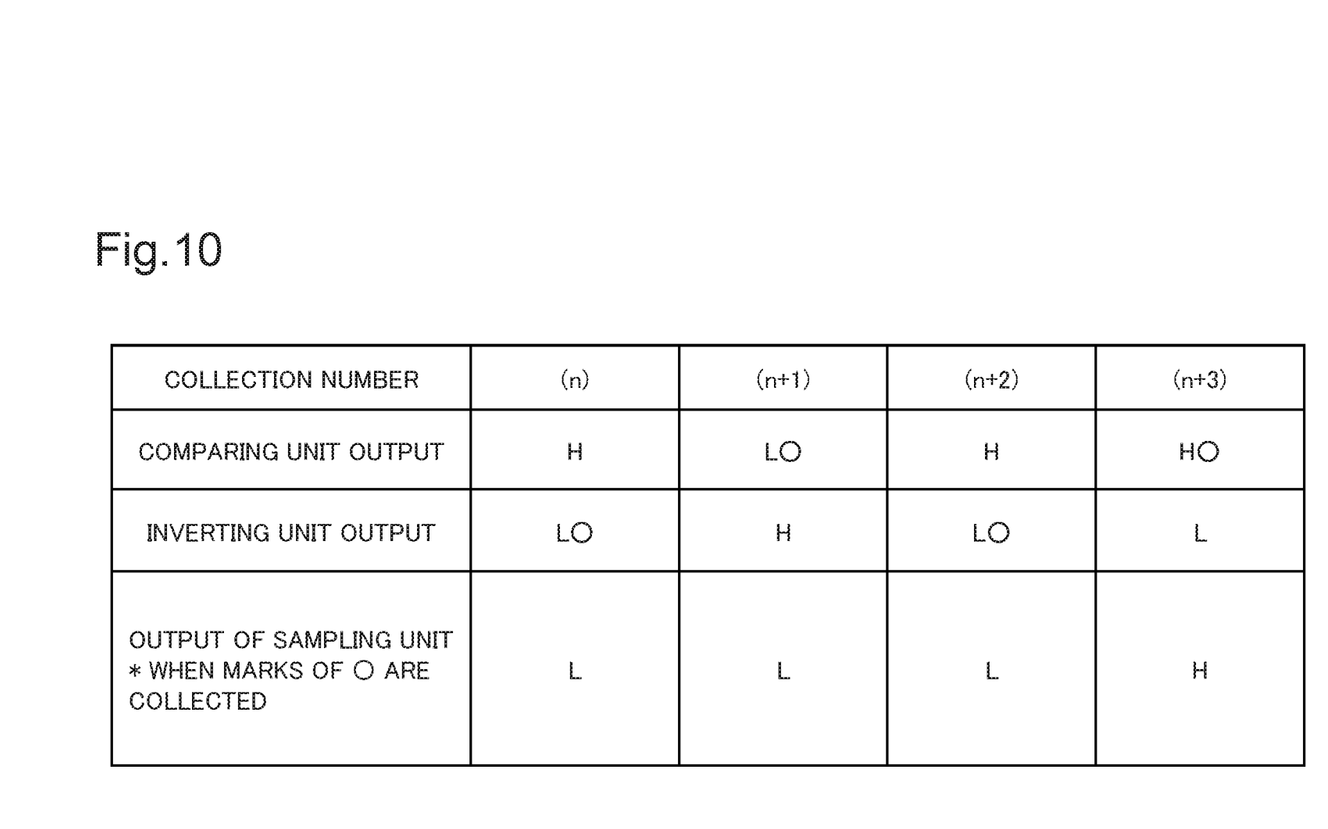
FIG. 10 is a diagram illustrating an example of an input signal and an output signal of a sampling unit in the second example embodiment of the present invention.

FIG. 10 illustrates a relation between states of a comparison result signal S18 and an inverted signal S20 and a signal output from the sampling unit 32. In FIG. 10, "COMPARING UNIT OUTPUT" indicates a state of a comparison result signal S18 input from the comparing unit 31 to the sampling unit 32. In FIG. 10, "INVERTING UNIT OUTPUT" indicates a state of an inverted signal S20 input from the inverting unit 33 to the sampling unit 32. In FIG. 10, "OUTPUT OF SAMPLING UNIT" indicates a state of the sampling result signal S19 output from the sampling unit 32. In FIG. 10, a comparison result signal S18 and an inverted signal S20 are alternately sampled, and are output from the sampling unit 32.

A sampling cycle is set based on a cycle of controlling power of light in the light output unit 11, characteristics of the light receiving unit 13 and the current/voltage converting unit 34, and the like. The sampling cycle is set, for example, as being shorter than the cycle of controlling light power of the light output unit 11 in such a way as not to be affected by the controlling cycle. The sampling cycle is set within a range of a cycle in which light/electricity conversion in the light receiving unit 13 can respond, and within a range of a frequency characteristic of the current/voltage converting unit 34. A configuration may be made in such a way that the sampling cycle is set variable based on a generation state of a random number. In such a configuration, for example, the control unit 20 may be configured in such a way as to determine a sampling cycle, based on occurrence rates of "High" and "Low", when setting a reference voltage in the sampling control unit 22.

The sampling unit 32 generates bit string data in which sampled bit data are arranged in the order of being sampled, and sends the generated bit string data as a sampling result signal S19 to the comparison verification unit 24 of the control unit 20.

When receiving a sampling result signal S19, the output unit 25 of the control unit 20 outputs the received bit string data as data of a random number to the CPU 200.

The comparison verification unit 24 of the control unit 20 analyzes a sampling result signal S19, determines whether a generated random number as data of a random number is statistically appropriate, and generates, as quality data, information of the determination result. The control unit 20 sends the generated quality data to the CPU 200, based on a request of the CPU 200. By repeating the above-described operation, the random number generating circuit 100 can supply, to the CPU 200, data for generating a random number.

While the above-described data for generating a random number are generated, the light output control unit 21 of the control unit 20 controls power of the light output from the light output unit 11. Based on information, input as a digital converted signal S22, of power of light in the light receiving unit 13, the control unit 20 controls light output from the light output unit 11 in such a way that an average value of power of light received by the light receiving unit 13 becomes constant. By performing control in such a way that an average value of power of light received by the light receiving unit 13 becomes a set value, it is possible to generate a high-quality random number, based on fluctuation of the power of the light. The control unit 20 previously stores information of a filter characteristic and a splitting ratio of the light wavelength filter unit 12, and information of a relation between a change amount of power of light in the light receiving unit 13 and an adjustment amount of power of light output by the light output unit 11. The control unit 20 generates a control signal of adjusting power of light output by the light output unit 11, and sends the generated control signal as a current control signal S11 to the light output unit 11. The control unit 20 controls the light output unit 11 by automatic power control (APC) in such a way that an average value of power of light received by the light receiving unit 13 becomes a previously set reference value. The light output unit 11 adjusts power of output light, based on the current control signal S11, and thereby, power of light received by the light receiving unit 13 is kept constant.

While the above-described data for generating a random number are generated, the temperature control unit 23 of the control unit 20 controls a temperature inside the optical module 10. When the random number generating circuit 100 is operating, the temperature monitoring unit 16 of the optical module 10 measures a temperature inside the optical module 10, and sends information of the measured temperature as a temperature measurement signal S13 to the temperature control unit 23 of the control unit 20. Based on information of the temperature inside the optical module 10 input as a temperature measurement signal S13 from the temperature monitoring unit 16, the temperature control unit 23 controls the temperature adjusting unit 15 in such a way that a temperature inside the optical module 10 becomes a set value. The temperature control unit 23 sends, to the temperature adjusting unit 15, as a temperature control signal S12, a control signal indicating an adjustment amount of a temperature of the temperature adjusting unit 15. The temperature adjusting unit 15 changes a temperature of the Peltier element, based on the temperature control signal S12, and thereby adjusts a temperature inside the optical module 10. The temperature adjusting unit 15 keeps a temperature inside the optical module 10 at a set value, thereby stabilizing a wavelength and power of light output by the light output unit 11.

While the above-described data for generating a random number are generated, the sampling control unit 22 monitors sampled bit string data, based on a sampling result signal S19. The sampling control unit 22 determines a reference voltage in the comparing unit 31, based on the monitoring result. The sampling control unit 22 adjusts a reference voltage in such a way that occurrence rates of "High" and "Low" becomes 1:1. The sampling control unit 22 calculates occurrence rates of "High" and "Low", based on data of prescribed time or prescribed data amount. When an occurrence rate of "High" is high, the sampling control unit 22 sets a reference voltage in such a way as to become higher. When an occurrence rate of "Low" is high, the sampling control unit 22 sets a reference voltage in such a way as to become lower. When setting a new reference voltage, the sampling control unit 22 outputs, to the comparing unit 31, as a threshold voltage signal S14, a signal indicating the newly set reference voltage. The threshold voltage signal S14 is converted into an analog signal, and is output. A unit for the conversion to the analog signal may be provided outside the control unit 20.

While the above-described data for generating a random number are generated, the comparison verification unit 24 of the control unit 20 monitors light output from the light output unit 11, in addition to generating quality data of data for a random number. The comparison verification unit 24 monitors a deviation between a wavelength of light included in a monitoring result signal S16 and a previously set wavelength of light, and generates information of the deviation of the wavelength. The comparison verification unit 24 extracts information of power of light included in the monitoring result signal S16. The comparison verification unit 24 sends, to the output unit 25, the information of the deviation of the wavelength of light and the power. In response to a request of the CPU 200, the output unit 25 transmits, to the CPU 200, as an output signal S100, the information of the deviation of the wavelength of light and the power.

At a sampling cycle based on a cycle of noise of light output from the light output unit 11, the random number generating circuit 100 according to the present example embodiment samples, in the sampling unit 32, a voltage signal converted from light. Since a reference voltage at the time of sampling is set in such a way that a detection ratio of "High" and "Low" becomes 1:1, a random number having high contingency based on noise of light can be acquired.

The random number generating circuit 100 according to the present example embodiment splits output from the comparator of the comparing unit 31 into two pieces, and inverts one of the two pieces in the inverter of the inverting unit 33. For the two split signals, the random number generating circuit 100 according to the present example embodiment samples, in the sampling unit 32, the non-inverted signal and the inverted signal alternately. Sampling in such a method causes a ratio of "High" and "Low" of sampled signals to approach more closely to 1:1, thus improving quality on a random number.

The random number generating circuit 100 according the present example embodiment verifies quality of a random number, and outputs, to the CPU 200, the verification result and information of a light state on which a random number is based. Outputting the verification result of the quality of the random number enables the CPU 200 using a random number to grasp the quality of the random number and soundness of the light output unit 11 that is a generation source of a random number, and use the quality and the soundness in processing such as encryption.

In the random number generating circuit 100 according to the present example embodiment, a random number sequence acquired by the comparison verification unit 24 may be scrambled by a linear feedback shift register or the like. With such a configuration, randomness can be further improved, and a random number of stable quality can be acquired.

As described above, the random number generating circuit 100 according to the present example embodiment can provide a random number based on a natural phenomenon and difficult to predict, along with a verification result of quality of the random number, without complicating a circuit configuration.

While the invention has been particularly shown and described with reference to example embodiments thereof, the invention is not limited to these embodiments. It will be understood by those of ordinary skill in the art that various changes in form and details may be made therein without departing from the spirit and scope of the present invention as defined by the claims.

This application is based upon and claims the benefit of priority from Japanese patent application No. 2017-228299, filed on Nov. 28, 2017, the disclosure of which is incorporated herein in its entirety by reference.

REFERENCE SIGNS LIST

1 Light output means
2 Light receiving means
3 Current/voltage converting means
4 Comparing means
5 Sampling means
6 Output means
10 Optical module
11 Light output unit
12 Light wavelength filter unit
13 Light receiving unit
14 Monitoring light receiving unit
15 Temperature adjusting unit
16 Temperature monitoring unit
20 Control unit
21 Light output control unit
22 Sampling control unit
23 Temperature control unit
24 Comparison verification unit
25 Output unit
31 Comparing unit
32 Sampling unit
33 Inverting unit
34 Current/voltage converting unit
35 A/D converting unit
100 Random number generating circuit
200 CPU
S11 Current control signal
S12 Temperature control signal
S13 Temperature measurement signal
S14 Threshold voltage signal
S15 Current signal
S16 Monitoring result signal
S17 Sampling cycle signal
S18 Comparison result signal
S19 Sampling result signal
S20 Inverted signal
S21 Voltage signal
S22 Digital converted signal
S100 Output signal
S200 Request signal

The invention claimed is:

1. A random number generating method, comprising:
outputting light of a prescribed wavelength;
receiving light and converting the light into a current signal;
converting the current signal into a voltage signal;
converting the voltage signal into a binary signal by comparison with a reference voltage;
sampling, at a cycle being set based on a frequency of noise of the light, the converted binary signal, and converting the sampled signal into bit data; and
outputting bit string data in which the bit data are arranged in order of being converted.

2. The random number generating method according to claim 1, further comprising:
splitting the converted binary signal into a first path and a second path;
inverting potential of the binary signal in the second path; and
alternately sampling the binary signal input from the first path and the binary signal inverted and input from the second path.

3. The random number generating method according to claim 1, further comprising setting the reference voltage, based on a ratio of one level data frequency and another level data frequency of the sampled bit data.

* * * * *